F. L. JEFFERIES.
APPARATUS FOR WASHING, SEPARATING, AND CONCENTRATING STARCH.
APPLICATION FILED FEB. 6, 1911.
1,007,785.
Patented Nov. 7, 1911.
3 SHEETS—SHEET 1.
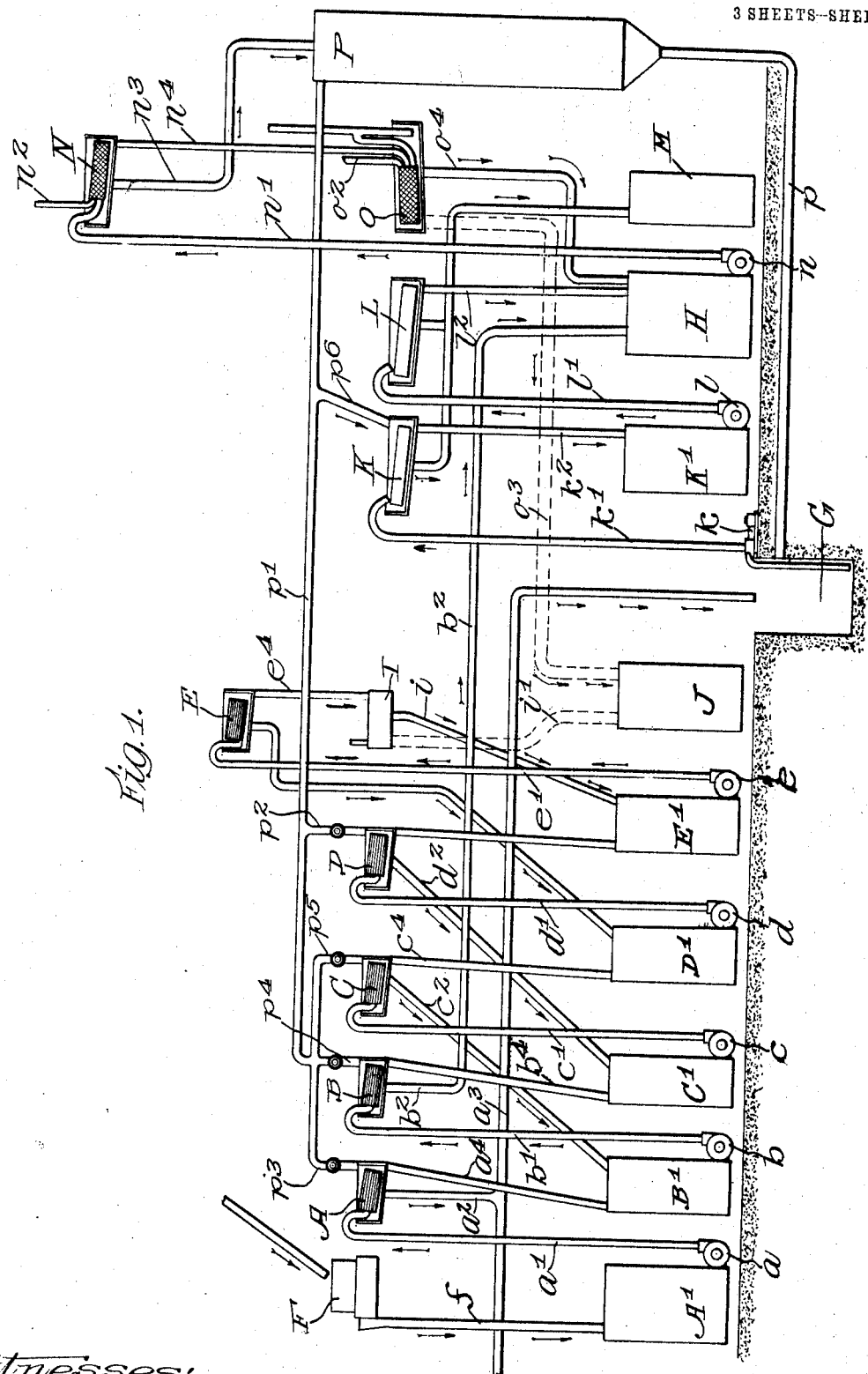

F. L. JEFFERIES.
APPARATUS FOR WASHING, SEPARATING, AND CONCENTRATING STARCH.
APPLICATION FILED FEB. 6, 1911.
1,007,785.
Patented Nov. 7, 1911.
3 SHEETS—SHEET 2.
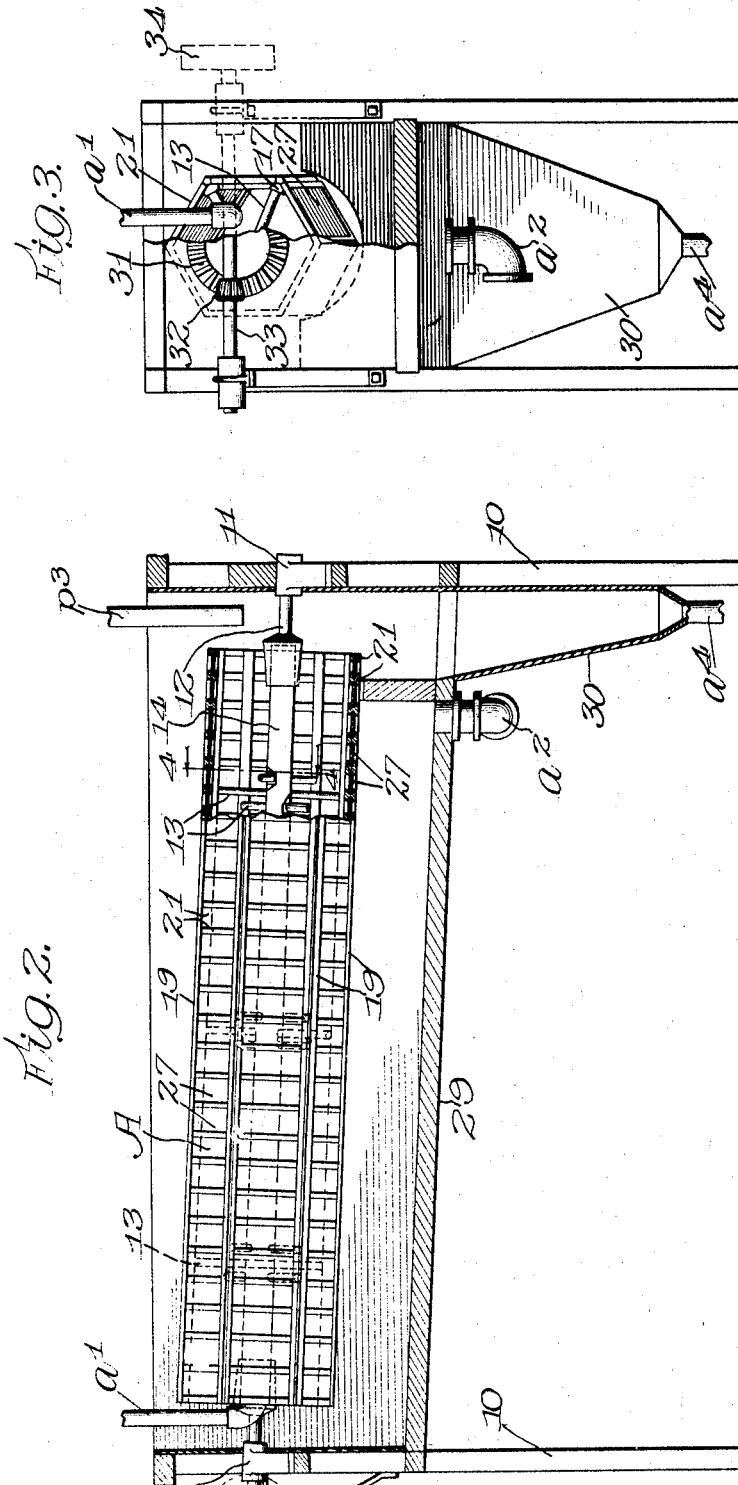

F. L. JEFFERIES.
APPARATUS FOR WASHING, SEPARATING, AND CONCENTRATING STARCH.
APPLICATION FILED FEB. 6, 1911.
1,007,785.
Patented Nov. 7, 1911.
3 SHEETS—SHEET 3.
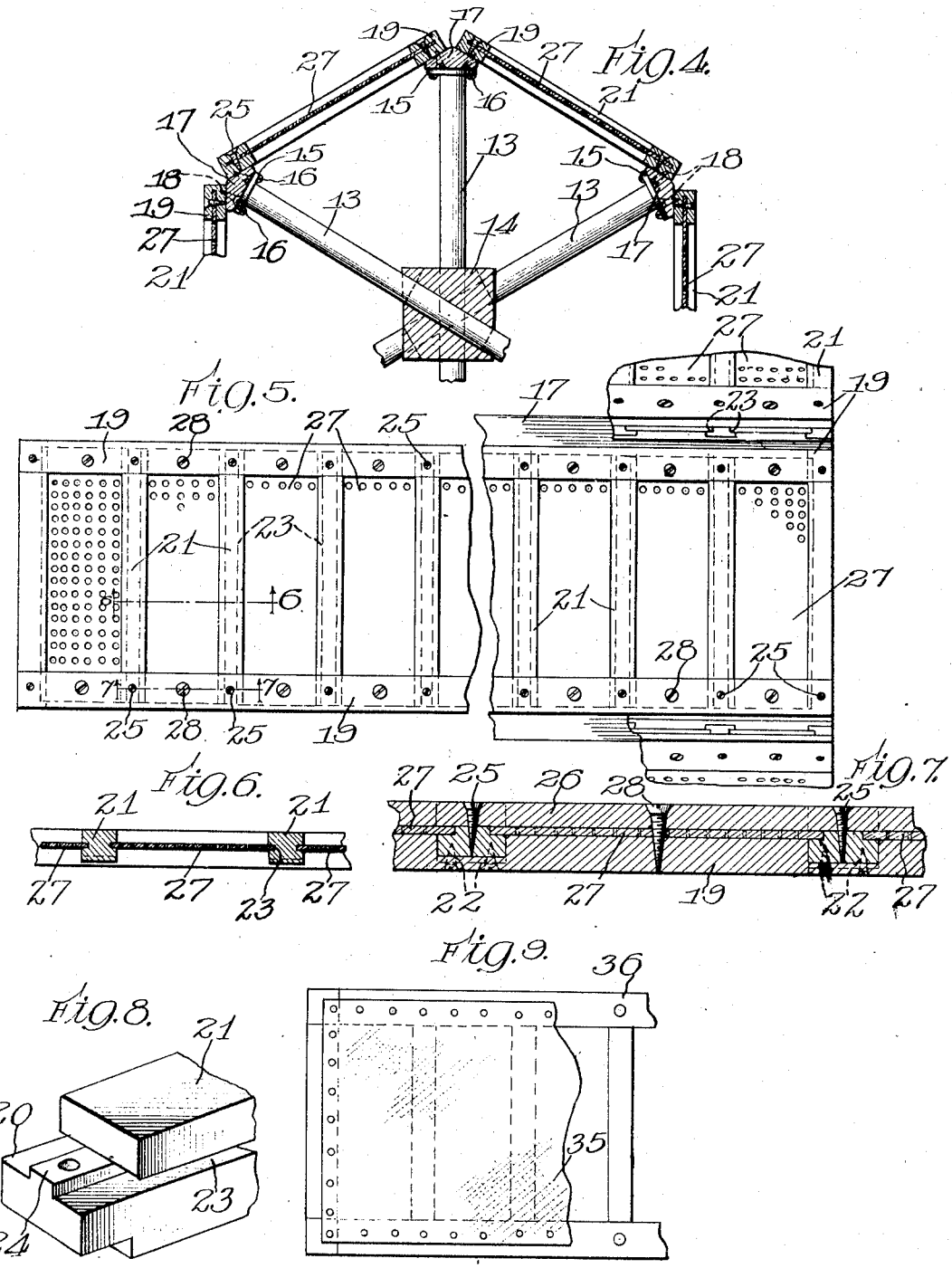

UNITED STATES PATENT OFFICE.

FREDRICK LESTER JEFFERIES, OF GRANITE CITY, ILLINOIS, ASSIGNOR TO CORN PRODUCTS REFINING COMPANY, A CORPORATION OF NEW JERSEY.

APPARATUS FOR WASHING, SEPARATING, AND CONCENTRATING STARCH.

1,007,785. Specification of Letters Patent. Patented Nov. 7, 1911.

Application filed February 6, 1911. Serial No. 606,896.

*To all whom it may concern:*

Be it known that I, FREDRICK L. JEFFERIES, a citizen of the United States, residing at Granite City, in the county of Madison and State of Illinois, have invented certain new and useful Improvements in Apparatus for Washing, Separating, and Concentrating Starch, of which the following is a specification.

My invention relates to apparatus for washing, separating and concentrating starch, and the invention has for its object to provide certain new and improved constructions, devices and arrangements in apparatus suitable for performing work of this sort which will be hereinafter described and claimed.

One of the primary objects of the invention is to provide an apparatus suitable for use in making the separation between the starch particles and the other constituents of the grain, after the germ has been removed and the residue ground up, in which the separating operation is performed, in part at least, by rotary reels arranged and operated in a novel manner instead of with the ordinary flat shakers. While it has been proposed to use reels instead of shakers for making this separation, so far as I am aware, no practical form of apparatus has ever been devised for carrying out the idea, the separation in question having been, until my invention was put in practice, universally carried out by means of the shakers. Ordinarily the grain after being ground is passed first over a set of relatively coarse shakers. These shakers are provided with a series of sprinklers and the material receives a series of washings first with the starch liquor and afterward with fresh water. The resultant liquors are divided according to densities, some of the lightest being used for washing again or mixing into the process at other stages, the more concentrated being passed over fine mesh shakers. The liquor from this set of shakers goes to the settling tanks, the solid matter is returned to the bur mills. Although this has been the common method for a number of years, it is open to several objections. In the first place, the washing is not thoroughly done so that there is always a good deal of starch which tails off from the shakers with the bran. The losses of solid substances carried off in the water are also considerable. Further, the resultant starch liquor is very dilute so that the settling tanks have to be comparatively large or a great many of them used. For the same reason the settling operation takes a long time to perform. Furthermore, shakers are expensive to build, need constant repair, and require, because or their oscillatory movements, considerable power to run them. The oscillating movement of the shakers also causes deterioration in the building in which the shakers are located.

The apparatus of the present invention has obviated some of the above objections to the old system of washing, and minimized others.

Generally speaking, the invention consists, in its principal characteristic of novelty, in the arrangement of a series of reels through which the material is run successively and through which the washing liquor is run in reverse order. That is, the tailings from the first reel are carried to the next reel and so on through the series, while the fresh washing liquid, fresh water or very light starch water, is introduced into the last reel of the series, and when drained off from the same, more concentrated by the addition of starch particles washed from the bran in the reel, is mixed with the material next treated in the next preceding reel of the series, and so on until it is discharged as a relatively heavy starch liquor, from the first reel.

The apparatus is shown and will be described as employing rotary reels for making the desired separation the primary object of my invention being to provide a suitable form of reeling apparatus for making the separation in question; but I apprehend that some advantage might be retained if the ordinary shakers were used instead of the reels in an arrangement substantially such as the arrangement herein shown and described.

The invention has for further objects such other new and improved constructions, arrangements and devices in apparatus for washing, separating and concentrating starch as will be hereinafter more particularly described and claimed.

The invention is shown, in a preferred embodiment, in the accompanying drawings, in which—

Figure 1 is a diagrammatic view of the washing, separating and concentrating apparatus as a whole; Fig. 2, a longitudinal sectional elevation of one of the reels and associated parts; Fig. 3, an end elevation of the same; Fig. 4, a fragmentary sectional view taken on line 4—4 of Fig. 2; Fig. 5, a fragmentary elevation of one face or side of the reel; Fig. 6, a detail section on line 6—6 of Fig. 5; Fig. 7, a detail section on line 7—7 of Fig. 5; Fig. 8, a view, in perspective, of the end of one of the guiding strips for the metal screening elements, and Fig. 9, a fragmentary elevation illustrating a modified form of construction.

Like characters of reference indicate like parts in the several figures of the drawings.

Referring first to Figs. 2 to 8 inclusive, which show the preferred form of reel construction, although it will be obvious that I might employ reels of different construction, 10 represents a frame work supporting bearings 11 at opposite ends, in which bearings turns the shaft 12 which carries the reel. Preferably the reel is polygonal in cross section, I have shown it hexagonal, and consists of a frame work secured to shaft 12, and a number of screening elements removably mounted on the frame work. I have shown three six arm spiders formed by the spokes 13 which extend through the square part 14 of shaft 12. The arms of the spiders are formed at their ends with the projecting ledges 15 to which are secured, for example by the screws 16, the wooden strips or longitudinal frame members 17 which run the length of the reel. To each of the two angularly disposed faces of the frame members 17 is secured by means of the screws 18 the longitudinal strips 19 recessed at intervals to receive the tenons 20 of the cross pieces or guiding strips 21. The latter are secured to the longitudinal strips by means of screws 22. The cross pieces are formed along opposite edges with the kerfs 23. The tenon at each end has a projection 24 on its upper surface, the height of which is the same as the width of kerfs 23. Resting on these projections and secured thereto by the screws 25 are the strips 26 which run the length of the reel and, because of projections 24, are spaced away from the strips 19. The screening elements consist of a number of perforated metal, preferably copper, plates 27 which are slipped through the spaces between strips 19 and 26 and into the kerfs 23 in the cross pieces 21. These perforated plates or screens are held in position in any suitable manner, for example, by means of the screws 28. Supported on the frame work 10 under the rail is a trough 29 which discharges through a pipe $a^2$ at its lower end. Beyond the trough is a tailings discharge spout 30. $a'$ designates a pipe through which the material to be treated is conducted to the interior of the screen, and $a^4$ a pipe leading from the tailings discharge chute. $p^3$ is a pipe which discharges liquid into the tailings chute for the purpose of carrying tailings down pipe $a^4$. The purpose of these parts will be apparent from the description of the apparatus as a whole. The shaft 12 may be driven in any suitable manner. For example, it may be provided with a bevel gear 31 driven by a bevel pinion 32 on a shaft 33 provided with a belt pulley 34. In Fig. 9 I have shown a modified construction in which fine strips of bolting cloth 35 are tacked to a suitable reel frame work 36.

The apparatus as a whole, in a preferred form, is shown diagrammatically in Fig. 1. Referring to this figure, A, B, C, D and E designate five reels preferably of the sort above described, although it will be understood that reels of a different construction might be employed. A larger number of units than this might obviously be employed, and furthermore, each unit might consist of several reels operated in parallel instead of the single reel shown. The particular installation which I have in mind in describing the invention employs three reels at A, three at B, two at C, one at D and two at E. I have not shown herein such an arrangement as it would mean simply the needless multiplication of lines in the drawing, as it will be obvious that two or three reels working in parallel would operate in the same way as a single reel except that in employing a plurality of reels to constitute the several units, the number of reels in each unit or set may be made to differ in accordance with the amount of work which has to be done at the particular stage of the separation.

F designates a bur mill in which the corn is ground. A' is a tub which receives the ground grain from the mill F through pipe $f$, and B', C', D' and E' are change tubs which receive the tailings from, respectively, A, B, C and D. A pump $a$ and pipe $a'$ take the material in tub A' and deliver it to reel A. The pipe $a^2$ conducts the starch liquor from the reel A. This pipe, as shown, connects with a pipe $a^3$ which leads to the heavy starch well G. The tailings from reel A go through the pipe $a^4$ to the tub B'. The subsequent reels and change tubs in the series have similar connections which, having been correspondingly designated on the drawings need not be adverted to separately, except that, in the particular installation shown, the pipe $b^2$ from reel B leads to a light starch liquor tub H, the starch liquor discharge pipes $c^2$, $d^2$, $e^2$, leading back into, respectively, change tubs B', C' and D' while the tailings discharge pipe $e^4$ from reel E leads to the expeller I. The liquid from the expeller I is shown as returned to the system through a pipe $i$ which leads to the tub E'. The bran from the expeller is carried by means of a suitable conveyer $i'$ to the feed repository J shown conventionally in the drawing.

The reels A, B, C, D and E have relatively coarse screens such, for example, as the perforated copper plates of the reel construction shown in Figs. 2 to 8 inclusive. As a result, some gluten or other foreign matter may be found in the starch liquor when it reaches the heavy starch well G. Preferably therefore I make a re-separation of this liquor upon fine mesh silk shakers K and L, of ordinary construction, although a fine mesh silk reel might also be effectively used at this point.

The liquor in the starch well is carried by means of pump $k$ and pipe $k'$ to shaker K, the tailings from which pass through pipe $k^2$ to tub K' from which they are taken by pump $l$ and pipe $l'$ to the second shaker L, the tailings from which go through a pipe $l^2$ into the light starch water tub H. The starch liquor from shaker K is conducted by a pipe $k^3$ and that from shaker L by a pipe $l^3$ to the starch tables which are represented conventionally at M. The starch liquor from reel B has been described as going to the light starch water tub H. In order to remove the gluten and other foreign particles from this liquid, it is put through a separating operation in two silk reels N and O of the sort indicated by Fig. 9. A pump $n$ and pipe $n'$ takes the starch water from tub H to reel N where it is mixed with a fresh wash water, for example, sulfur water, introduced through a pipe $n^2$. The starch liquor from N passes through a pipe $n^3$ into a cone settler P. The tailings from reel N pass through a pipe $n^4$ into the second silk reel O which is supplied with fresh wash water, for example sulfur water, through a pipe $o^2$. The tailings from reel O pass by means of a conveyer $o^3$ to the feed repository J. The starch liquor from O goes through a pipe $o^4$ to the light starch water tub H. The heavy starch liquor from settler P goes through a pipe $p$ to the starch well G. The overflow from the top of settler P passes through a pipe $p'$ which has a valved branch $p^2$ discharging into the change tub E' through the tailings spout of reel D. Preferably also the pipe has the valved branches $p^3$, $p^4$, $p^5$, leading, respectively, to the tailings spouts of reels A, B and C. A branch pipe $p^6$ similarly leads to the tailings spout of shaker K.

While I have shown a practical system involving a certain particular disposition of the apparatus, it will be readily understood that there might be very considerable change in these details which are some of them matters of but little importance.

The operation of the above described apparatus when used in making the separation between the starch particles and the other constituents of the ground grain, is as follows: The grain which has been first broken up and the germ removed, is ground in the bur mill F and then goes to tub A'. It is mixed with liquid in the mill and more liquid, water or light starch liquor, may be supplied if necessary when it reaches the change tub A'. From here it goes to reel A and if the resultant starch liquor derived is sufficiently concentrate (and this is contemplated by the arrangement shown and described) it is simply subjected to a re-separation in shakers K and L and then is ready for the starch tables. The tailings from reel A go into the change tub B' and are there mixed with starch liquid from the reel C. The mixed material is then subjected to another separation in the reel B. The tailings from B go into the tub C' and there are mixed with starch liquor from the reel D and then go into reel C. A similar operation takes place in connection with the separation in reels D and E. The tailings from E go to the expeller I, the liquid from the expeller back to change tub E', while the dry bran is conveyed to the feed repository J. The starch liquor from B goes through pipe $b^2$ into the light starch water tank H, then through the silk reels N and O and finally to the settler P, the heavy starch liquor from the bottom of which goes to the starch well G or other suitable reservoir, while the light liquid at the top of the settler is used as a wash water in the operations above described. It will be seen that the material to be separated is passed successively through the reels A, B, C, D, E, and is washed, so far as the separation in B, C, D and E is concerned, with a liquid which becomes constantly heavier because of this circulation through the reels in the direction reverse to that taken by the bran. Obviously if the starch liquor withdrawn from reel B is found sufficiently concentrate for the purpose for which it is to be used, the settler P could be eliminated. It will be evident further that if desired the independently operated first reel A might be omitted.

While I have shown and described a preferred form of apparatus for carrying out my invention there might be other changes made, than those above indicated, in the arrangement and connections of the various instrumentalities and in their mechanical construction. Therefore I do not limit myself to the particulars above set forth except so far as the same are made limitations on certain of the claims herein.

While the apparatus is particularly suitable for making the above described separation it might be used in other connections where similar conditions prevail and similar results are desired to be obtained.

I do not claim herein the process of separating starch particles from other ingredients of the grain which is here described incidentally as this process is made the subject matter of my copending application, Serial No. 606,895, filed February 6, 1911.

I claim:

1. In apparatus of the character described, the combination with a series of reels, of means for causing the material treated to be successively passed through a plurality of said reels and for causing the washing liquid to be passed through a plurality of said reels in reverse order.

2. In apparatus of the character described, the combination with a series of reels, of means for causing the material treated to be successively passed through said reels one after the other, and for causing the washing liquor to be passed through said reels one after another in reverse order.

3. In apparatus of the character described, the combination with a series of reels, of means for causing the material treated to be successively passed through a plurality of said reels and for causing the washing liquid to be passed through a plurality of said reels in reverse order, and screening mechanism for making a second separation as between the constituents of the concentrated liquor withdrawn from said reels.

4. In apparatus of the character described, the combination with a series of reels, of a corresponding series of change vessels from which said reels are respectively supplied, means for conducting the tailings from said reels to the change vessels of the reels respectively farther on in the series, and means for conducting the liquor from said reels to respectively the change vessels or reels farther back in the series.

5. In apparatus of the character described, the combination with a series of reels, of a corresponding series of change vessels from which said reels are respectively supplied, means for conducting the tailings from said reels to the change vessels of the reels respectively next subsequent in the series, and means for conducting the liquor from said reels to the vessels of the reels respectively next precedent in the series.

6. In apparatus of the character described, the combination with a series of reels, of a corresponding series of change vessels from which said reels are respectively supplied, means for conducting the tailings from said reels to the change vessels of the reels respectively next subsequent in the series, means for conducting the liquor from said reels to the vessels of the reels respectively next precedent in the series, and means for adding fresh liquor to the material treated in the last reel of the series.

7. In apparatus of the character described, the combination with a series of reels, of a corresponding series of change vessels from which said reels are respectively supplied, means for conducting the tailings from said reels to the change vessels of the reels respectively next subsequent in the series, means for conducting the liquor from said reels to the vessels of the reels respectively next precedent in the series, means for adding fresh liquor to the material treated in the last reel of the series, and means for withdrawing liquor from the first reel of the series and subjecting it to a second and closer separation.

8. In apparatus of the character described, the combination with a series of reels, of means for causing the material treated to be successively passed through a plurality of said reels and for causing the washing liquid to be passed through a plurality of said reels in reverse order, an expeller which receives the tailings from the last reel, and means for conducting the liquid from the expeller back to the last reel.

9. In apparatus of the character described, the combination with a series of reels provided with metal screening elements, of a corresponding series of change vessels from which said reels are respectively supplied, means for conducting the tailings from said reels to the change vessels of the reels respectively next subsequent in the series, means for conducting the liquor from said reels to the change vessels of the reels respectively next precedent in the series, screening devices provided with bolting cloth screens, and means for conducting the concentrated liquor from the first of said series of reels to said screening devices.

10. In apparatus of the character described, the combination with a series of reels provided with metal screening elements, of a corresponding series of change vessels from which said reels are respectively supplied, means for conducting the tailings from said reels to the change vessels of the reels respectively next subsequent in the series, means for conducting the liquor from said reels to the change vessels of the reels respectively next precedent in the series, silk reels of finer mesh, and means for conducting the concentrated liquor from said first mentioned series of reels to said silk reels.

11. In apparatus of the character described, the combination with a reel, of a screening device of finer mesh adapted to receive the liquor from said reel, a series of reels similar to said first mentioned reel, means for passing the tailings from the first mentioned reel through said series of reels in succession, means for introducing fresh washing liquid into the material treated in the last reel of said series, means for withdrawing the liquor from each of said series of reels, except the first, and mixing it with the material treated in the preceding reel of the series, and means for separately discharging the liquor from said first reel and from the first of said series of reels.

12. In apparatus of the character described, the combination with a reel, of a screening device of finer mesh adapted to receive the liquor from said reel, a series of reels similar to said first mentioned reel, means for passing the tailings from the first mentioned reel through said series of reels in succession, means for introducing fresh washing liquid into the material treated in the last reel of said series, means for withdrawing the liquor from each of said series of reels, except the first, and mixing it with the material treated in the preceding reel of the series, means for separately discharging the liquor from said first reel and from the first of said series of reels, and means for making further separations as between the ingredients of said liquors.

13. In apparatus of the character described, the combination with a series of screening elements, of a corresponding series of change vessels from which said screening elements are respectively supplied, means for conducting the tailings from said screening elements to the change vessels of the screening elements respectively next subsequent in the series, means for conducting the liquor from said screening elements to the vessels of the screening elements respectively next precedent in the series, means for adding fresh liquor to the material treated in the last screening element of the series, and means for withdrawing the liquor from the first screening element.

14. In apparatus of the character described, the combination with a series of rotary screening elements, of a corresponding series of change vessels from which said screening elements are respectively supplied, means for conducting the tailings from said screening elements to the change vessels of the screening elements respectively next subsequent in the series, means for conducting the liquor from said screening elements to the vessels of the screening elements respectively next precedent in the series, means for adding fresh liquor to the material treated in the last screening element of the series, and means for withdrawing the liquor from the first screening element.

FREDRICK LESTER JEFFERIES.

Witnesses:
 F. M. SAYRE,
 A. N. HOMAN.